United States Patent
Teng et al.

(10) Patent No.: US 12,409,508 B2
(45) Date of Patent: Sep. 9, 2025

(54) RESISTANCE WELDING ELECTRODES, METHODS OF WELDING FLANGES THEREWITH, AND VEHICLES

(71) Applicant: GM GLOBAL TECHNOLOGY OPERATIONS LLC, Detroit, MI (US)

(72) Inventors: Zhenke Teng, Troy, MI (US); John A Gerke, Ortonville, MI (US); Pei-chung Wang, Troy, MI (US); Robert W Watson, China, MI (US); Russell A Webster, Marine City, MI (US); Jason M Brown, Goodrich, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 639 days.

(21) Appl. No.: 17/814,869

(22) Filed: Jul. 26, 2022

(65) Prior Publication Data

US 2024/0033844 A1    Feb. 1, 2024

(51) Int. Cl.
*B23K 11/30* (2006.01)
*B23K 11/11* (2006.01)
*B23K 11/24* (2006.01)
*B23K 101/00* (2006.01)

(52) U.S. Cl.
CPC ......... *B23K 11/3054* (2013.01); *B23K 11/115* (2013.01); *B23K 11/24* (2013.01); *B23K 2101/006* (2018.08)

(58) Field of Classification Search
CPC .................. B23K 11/115; B23K 11/3054
See application file for complete search history.

(56) References Cited

U.S. PATENT DOCUMENTS

| | | | | |
|---|---|---|---|---|
| 2,079,857 | A * | 5/1937 | Holan, Jr. | B23K 11/115 |
| | | | | 219/86.21 |
| 6,109,506 | A * | 8/2000 | Blair | B23K 11/115 |
| | | | | 228/175 |
| 10,421,148 | B2 * | 9/2019 | Sigler | B23K 11/115 |
| 10,857,618 | B2 * | 12/2020 | Sigler | B23K 11/115 |
| 11,065,710 | B2 * | 7/2021 | Sigler | B23K 11/20 |
| 11,278,985 | B2 * | 3/2022 | Hahnlen | B32B 15/20 |
| 2005/0247679 | A1 * | 11/2005 | Wang | B23K 35/0205 |
| | | | | 219/119 |
| 2017/0297135 | A1 * | 10/2017 | Sigler | B23K 11/20 |
| 2021/0276118 | A1 * | 9/2021 | Henderkott | B23K 11/115 |
| 2022/0040781 | A1 * | 2/2022 | Aoyama | B21J 15/025 |

FOREIGN PATENT DOCUMENTS

| | | | | |
|---|---|---|---|---|
| DE | 102019102720 | A1 * | 8/2020 | ........ B23K 11/3018 |
| KR | 20230133630 | A * | 9/2023 | ............ F16B 19/04 |
| KR | 20230133631 | A * | 9/2023 | ........... B23K 11/115 |
| WO | WO-2012043587 | A1 * | 4/2012 | ........ B23K 37/0443 |
| WO | WO-2022194472 | A1 * | 9/2022 | .......... B23K 11/3009 |

* cited by examiner

*Primary Examiner* — Woody A Lee, Jr.
(74) *Attorney, Agent, or Firm* — Ingrassia Fisher & Lorenz, LLP | IF&L

(57) ABSTRACT

Welding electrodes, methods, and vehicles are provided. The welding electrodes include a body that includes a weld face on a distal end of the body configured to contact a workpiece and apply an electrical current thereto. The body has a maximum diameter of 13 millimeters or less. The welding electrode includes an insulative material covering at least a portion of the body, the insulative material configured to mitigate current shunting upon contact between the insulative material and a workpiece of a workpiece stack-up while using the welding electrode to resistance weld the workpiece stack-up.

10 Claims, 7 Drawing Sheets

RESISTANCE WELDING ELECTRODES, METHODS OF WELDING FLANGES THEREWITH, AND VEHICLES

INTRODUCTION

The technical field of this disclosure relates generally to resistance welding and, more particularly, to resistance spot-welding or resistance seam-welding of a metal or metal alloy workpiece.

Resistance welding (e.g., resistance spot-welding and resistance seam-welding) is a process used in various industries to join two or more metal workpieces. The automotive industry, for instance, often uses resistance welding to join metal workpieces during the manufacture of a vehicle door, hood, trunk lid, or lift gate, among other vehicle components. Multiple welds are typically made along a periphery of the metal workpieces or at some other location.

Resistance welding, in general, relies on the resistance to the flow of electrical current through contacting metal workpieces and across their faying interface to generate heat. To carry out a resistance welding process, a pair of opposed welding electrodes is clamped at aligned spots on opposite sides of the metal workpieces at a weld site. An electrical current is then passed through the workpieces from one welding electrode to the other. Resistance to the flow of the electrical current generates heat within the metal workpieces and at their faying interface. For workpieces formed of certain metals and alloys (e.g., aluminum and aluminum alloys) the heat generated at the faying interface typically initiates a molten weld pool that penetrates the aluminum workpieces from the faying interface. Upon cessation of the current flow, the molten weld pool solidifies into a weld nugget that forms all or part of a weld joint. After the resistance welding process is completed, the welding electrodes are retracted from the workpiece surfaces and the resistance welding process may be repeated at another weld site.

Due to the construction of currently available resistance welding system, including, for example, welding electrodes thereof, resistance welding of flanges of workpieces are limited to certain minimum dimensions. Typically, flanges must extend from adjacent portions of the workpiece by more than 10 millimeters (depending on the flange angle) to be capable of being resistance welded. Such dimensions (referred to herein as flange width) are generally necessary to provide adequate accessibility and cooling effects of the welding electrodes. A capability of welding flanges having flange widths of 10 millimeters or less may provide various benefits such as reduced vehicle weight and/or increased design possibilities.

Accordingly, it is desirable to provide systems and/or methods that are capable of resistance welding workpieces having flanges that are 10 millimeters or less in width. Furthermore, other desirable features and characteristics of the present invention will become apparent from the subsequent detailed description and the appended claims, taken in conjunction with the accompanying drawings and the foregoing technical field and background.

SUMMARY

A welding electrode is provided for resistance welding. In one embodiment, the welding electrode includes a body that includes a weld face on a distal end of the body configured to contact a workpiece and apply an electrical current thereto. The body has a maximum diameter of 13 millimeters or less. The welding electrode includes an insulative material covering at least a portion of the body, the insulative material configured to mitigate current shunting upon contact between the insulative material and a workpiece stack-up while using the welding electrode to resistance weld the workpiece stack-up.

In an embodiment, the weld face of the welding electrode has a diameter of 5 millimeters or less.

In an embodiment, the body of the welding electrode includes a first section that has a first diameter, the weld face has a second diameter that is less than the first diameter, and the body includes a first intermediate section between the first section and the weld face that transitions from the first diameter to the second diameter.

In an embodiment, the body of the welding electrode includes a first section that has a first diameter, the weld face has a second diameter that is less than the first diameter, the body includes a second section that has a third diameter that is less than the first diameter and greater than the second diameter, the body includes a first intermediate section between the first section and the second section that transitions from the first diameter to the third diameter, the body includes a second intermediate section between the second section and the weld face that transitions from the third diameter to the second diameter.

In an embodiment, the body of the welding electrode includes interior surfaces that define a cavity configured to receive a cooling fluid.

In an embodiment, the insulative material includes a nylon polyamide, an ethylene-chlorotrifluoroethylene, a chlorotrifluoroethylene, a silicone, a silicone-glass, a silicone-ceramic, or a ceramic-inorganic material. In an embodiment, the insulative material is 6 millimeters or more from the weld face of the body.

In an embodiment, the welding electrode is configured to be used to weld a flange of a workpiece that extends from the remainder of the workpiece by a dimension of 8 millimeters or less.

In another embodiment, a method is provided for resistance welding. The method includes providing a workpiece stack-up including a first flange of a first workpiece and a second flange of a second workpiece, wherein the first flange extends from a remainder of the first workpiece by a first dimension of 10 millimeters or less and the second flange extends from a remainder of the second workpiece by a second dimension of 10 millimeters or less, bringing a first welding electrode into contact with the first flange and bringing a second welding electrode into contact with the second flange, passing an electrical current between the first welding electrode and the second welding electrode in accordance with a welding schedule that includes a pre-heating phase and a welding phase, wherein the pre-heating phase includes at least one preheating step during which the electrical current is held at a first current value that is below a minimum current value necessary to cause melting of the first flange and the second flange, wherein the welding phase includes at least one welding step during which the electrical current is held at a second current value that is above the minimum current value for a time sufficient to form a molten weld pool within the first workpiece and the second workpiece, wherein the electrical current is direct current, and ceasing the passing of the electrical current between the first welding electrode and the second welding electrode to allow the molten weld pool to solidify into a weld nugget that forms all or part of a weld joint between the first workpiece and the second workpiece.

In an embodiment, the body includes a first section that has a first diameter, a weld face at a distal end of the body that has a second diameter that is less than the first diameter, and a first intermediate section between the first section and the weld face that transitions from the first diameter to the second diameter.

In an embodiment, the body includes a first section that has a first diameter, a weld face at a distal end of the body that has a second diameter that is less than the first diameter, a second section that has a third diameter that is less than the first diameter and greater than the second diameter, a first intermediate section between the first section and the second section that transitions from the first diameter to the third diameter, and a second intermediate section between the second section and the weld face that transitions from the third diameter to the second diameter.

In an embodiment, the method includes providing a cooling fluid to a cavity defined by interior surfaces of the body while passing the electrical current between the first welding electrode and the second welding electrode.

In an embodiment, the method includes covering at least a portion of the body of the first welding electrode with an insulative material configured to mitigate current shunting upon contact between the insulative material and the first workpiece while passing the electrical current between the first welding electrode and the second welding electrode. In an embodiment, the insulative material is 6 millimeters or more from a distal end of the body.

In an embodiment, the first dimension is 8 millimeters or less and the second dimension is 8 millimeters or less.

In an embodiment, the welding phase that includes: a first step during which the electrical current is increased from the first current value to the second current value at a first rate of change, a second step during which the electrical current is held at the second current value, and a third step during which the electrical current is decreased from the second current value at a second rate of change.

In an embodiment, the first current value is 0.3 to 2.0 kA and the second current value is 5.0 to 16.0 kA.

In an embodiment, the first welding electrode and the second welding electrode are each pressed against the first flange and the second flange, respectively, with a force of 2.5 kN or less.

In yet another embodiment, a vehicle is provided that includes a resistance-welded metal assembly that includes a first workpiece having a first flange, a second workpiece having a second flange, and a weld nugget that forms all or part of a weld joint between the first flange and the second flange. The first flange extends from the first workpiece by a first dimension of 10 millimeters or less and the second flange extends from the second workpiece by a second dimension of 10 millimeters or less. The weld nugget was formed by a resistance welding process that included a weld schedule that included a preheating phase and a welding phase. The pre-heating phase included at least one preheating step during which the electrical current was held at a first current value that is below a minimum current value necessary to cause melting of the first flange and the second flange. The welding phase included at least one welding step during which the electrical current was held at a second current value that is above the minimum current value for a time sufficient to form a molten weld pool within the first workpiece and the second workpiece.

In an embodiment, the welding phase included: a first step during which the electrical current was increased from the first current value to the second current value at a first rate of change, a second step during which the electrical current was held at the second current value, and a third step during which the electrical current was decreased from the second current value at a second rate of change.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

Figure 1:
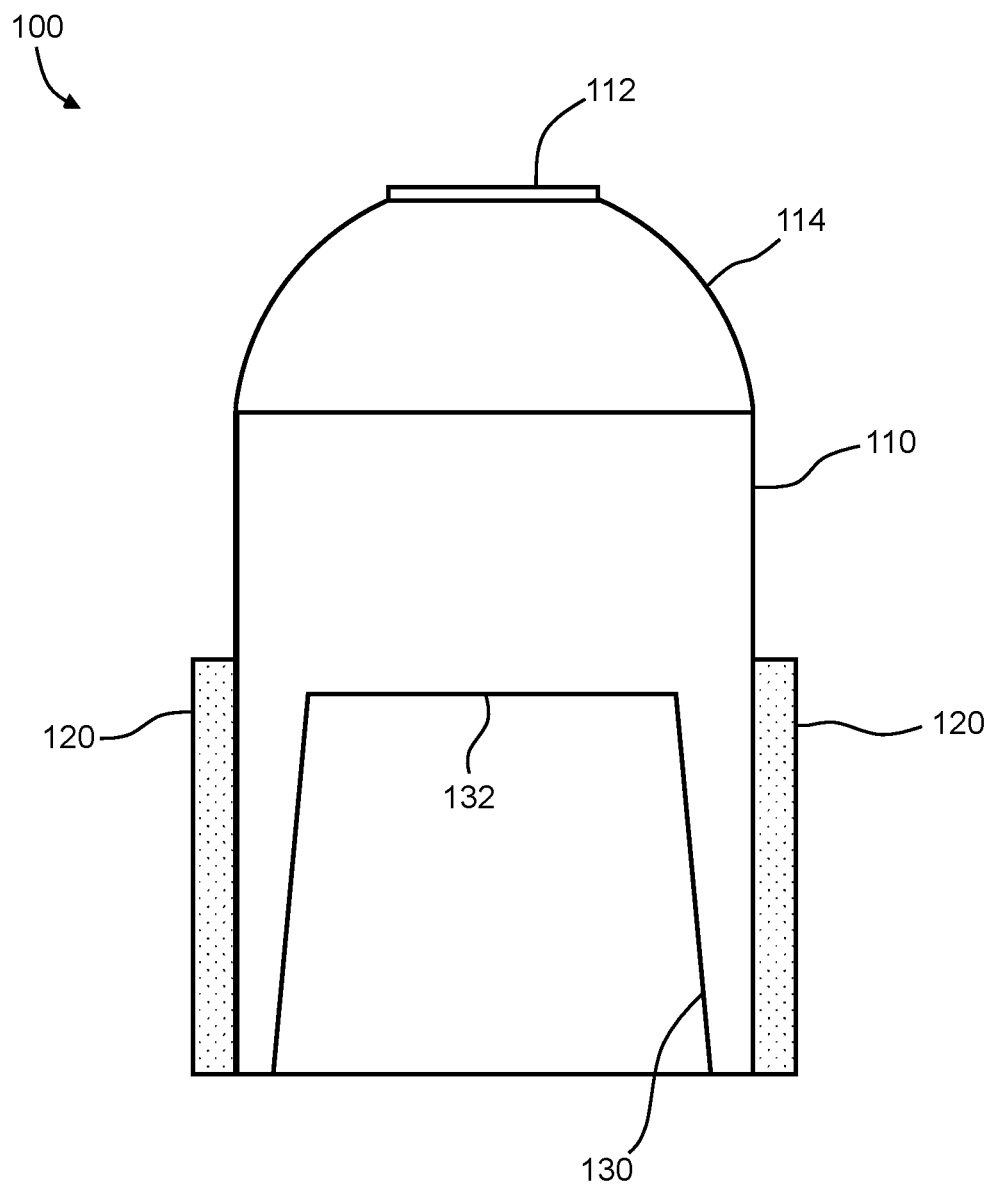
FIG. 1 is a cross-sectional view of a first welding electrode in accordance with an embodiment.

The following detailed description is merely exemplary in nature and is not intended to limit the application and uses. Furthermore, there is no intention to be bound by any expressed or implied theory presented in the preceding technical field, background, brief summary or the following detailed description.

As used herein, the word "exemplary" means "serving as an example, instance, or illustration". As used herein, "a," "an," or "the" means one or more unless otherwise specified. The term "or" can be conjunctive or disjunctive. Open terms such as "include," "including," "contain," "containing" and the like mean "comprising", but in certain embodiments may mean "consisting of". In certain embodiments, numbers in this description indicating amounts, ratios of materials, physical properties of materials, and/or use may be understood as being modified by the word "about". The term "about" as used in connection with a numerical value and the claims denotes an interval of accuracy, familiar and acceptable to a person skilled in the art. In general, such interval of accuracy is ±10%. All numbers in this description indicating amounts, ratios of materials, physical properties of materials, and/or use may be understood as modified by the word "about," except as otherwise explicitly indicated.

The figures are in simplified schematic form and are not to precise scale. Further, terms such as "upper", "lower", "above," "over," "below," "under," "upward," "downward," et cetera, are used descriptively of the figures, and do not represent limitations on the scope of the subject matter, as defined by the appended claims. Any numerical designations, such as "first" or "second" are illustrative only and are not intended to limit the scope of the subject matter in any way. It is noted that while embodiments may be described herein with respect to automotive applications, those skilled in the art will recognize their broader applicability.

Embodiments herein are related to resistance welding, such as to resistance spot-welding and resistance seam-welding of metal or metal alloy components. While specific embodiments may be described herein with reference to certain metals or metal alloy workpieces, such descriptions are not limiting. Workpieces of various conductive materials such as metals or metal alloys are contemplated. As used herein a "metal" workpiece or a workpiece comprised of the "metal or metal alloy", refers to such workpieces that are at least 10 wt. % of the named metal. In certain embodiments, such workpieces are at least 25 wt. %, such as at least 50 wt. %, for example at least 75 wt. %, such as at least 80 wt. %, for example at least 95 wt. % of the named metal. Elements of a metal alloy other than the named metal are referred to herein as alloying elements. The workpieces may be similar or dissimilar materials (e.g., steel and aluminum, low carbon steel and high strength steel, etc.). In some embodiments, a bonding material may be located between workpieces (e.g., adhesive, sealer, etc.).

Figure 2:
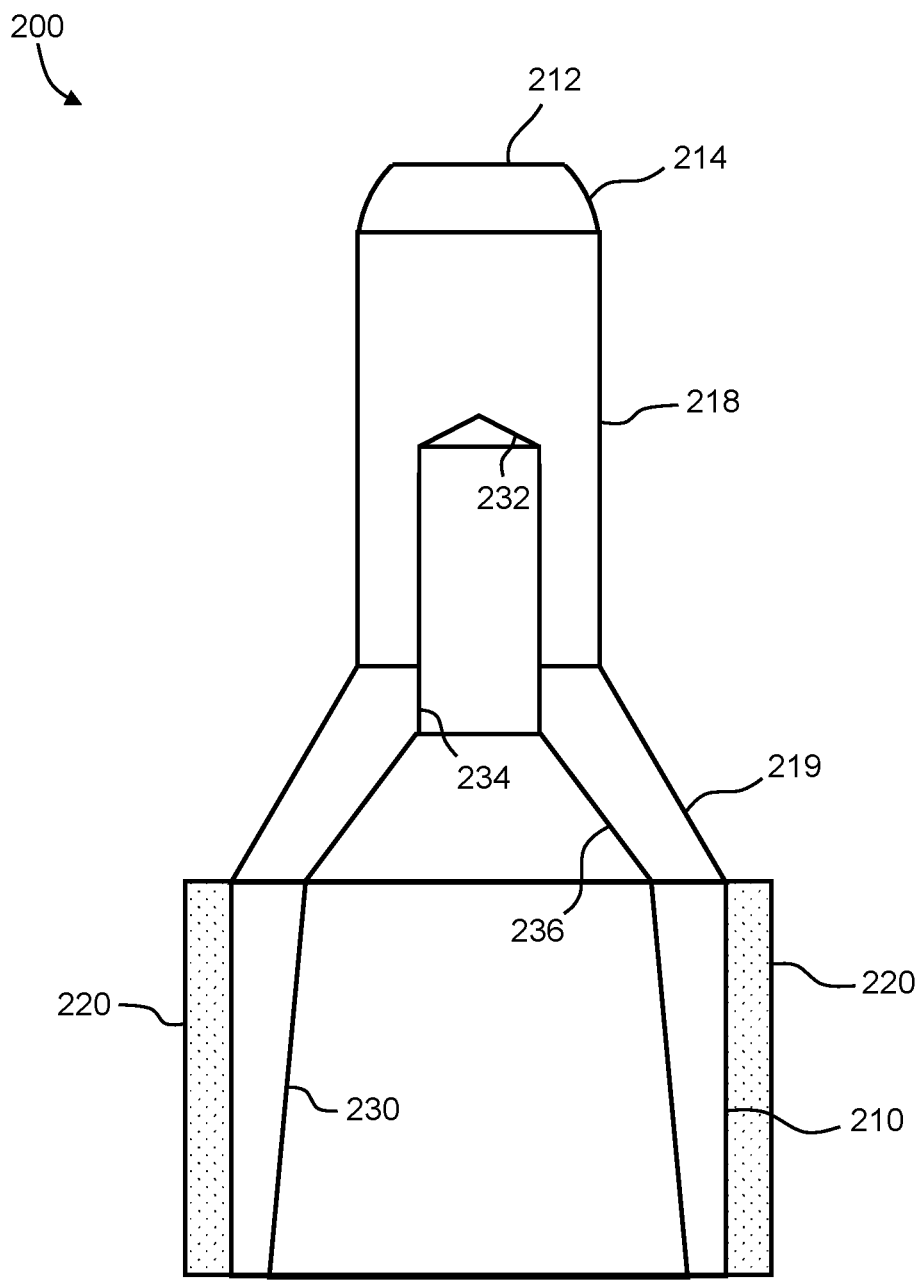
FIG. 2 is a cross-sectional view of a second welding electrode in accordance with an embodiment.

Referring initially to FIGS. 1 and 2, exemplary welding electrodes are presented that are configured for use in resistance welding workpieces to yield resistance welded assemblies having weld nuggets that form all or part of weld joints between workpieces thereof. FIG. 1 presents a cross-sectional view of a first welding electrode 100 and FIG. 2 presents a cross-sectional view of a second welding electrode 200.

The first welding electrode 100 of FIG. 1 includes a body having a generally cylindrical shape. The body includes a first section 110 that has a first diameter, a weld face 112 on a distal end of the body that has a second diameter that is less than the first diameter, and a first intermediate section 114 between the first section 110 and the weld face 112 that transitions from the first diameter to the second diameter. In this example, the first intermediate section 114 generally has a generally dome-like shape (e.g., truncated dome).

The second welding electrode 200 of FIG. 2 includes a body having a first section 210 that has a first diameter, a weld face 212 on a distal end of the body that has a second diameter that is less than the first diameter, a second section 218 that has a third diameter that is less than the first diameter and greater than the second diameter, a first intermediate section 219 between the first section 210 and the second section 218 that transitions from the first diameter to the third diameter, and a second intermediate section 214 between the second section 218 and the weld face 212 that transitions from the third diameter to the second diameter. In this example, first intermediate section 219 generally has a conical-like shape (e.g., truncated cone) and the second intermediate section 214 generally has a dome-like shape (e.g., truncated dome).

The first section 110 of the first welding electrode 100 and the first section 210 of the second welding electrode 200 are both configured to functionally couple with a resistance welding system.

The weld face 112 of the first welding electrode 100 and the weld face 212 of the second welding electrode 200 are both configured to contact a workpiece during a resistance welding process. In some embodiments, the weld faces 112/212 of both embodiments are substantially planar. In such embodiments, the surface of the workpiece in contact with the first welding electrode 100 or the second welding electrode 200 may be planar such that an entirety of the weld face 112/212 is in intimate contact with the workpiece.

The body of the first welding electrode 100 and the body of the second welding electrode 200 both include interior surfaces 130-132/230-236 that define a cavity configured to receive a cooling fluid during a resistance welding process in a manner sufficient to reduce the temperature of the respective welding electrode. In some embodiments, the cooling fluid is water. Various configurations may be used for the cavities. Nonlimiting examples are disclosed in U.S. Pat. No. 7,265,313 to Stevenson et al., the contents of which are incorporated herein in their entirety.

In various embodiments, the first welding electrode 100 and the second welding electrode 200 are each configured to be used in a resistance welding process to weld a workpiece stack-up that includes a first flange of a first workpiece and a second flange of a second workpiece, wherein the first flange and the second flange are narrow flanges. As used herein, a narrow flange is a flange of a workpiece that extends from the remainder of the workpiece by a dimension of 10.0 millimeters or less, for example, 9.0 millimeters or less, 8.0 millimeters or less, 7.0 millimeters or less, 6.0 millimeters or less, 5.0 millimeters or less, or 4.0 millimeters or less. In some embodiments, the flange may define an angle with adjacent portions of the workpiece that is between 90 and 179 degrees, such as about degrees, about 100 degrees, about 110 degrees, about 120 degrees, about 130 degrees, about 140 degrees, about 150 degrees, about 160 degrees, or about 170 degrees.

To accommodate welding of narrow flanges, in some embodiments, the first welding electrode 100 and the second welding electrode 200 may each have a maximum diameter of 13.0 millimeters or less, for example, 12.0 millimeters or less, 11.0 millimeters or less, 10.0 millimeters or less, 9.0 millimeters or less, 8.0 millimeters or less, 7.0 millimeters or less, 6.0 millimeters or less, 5.0 millimeters or less, or 4.0 millimeters or less. In certain embodiments, the first diameter of the first welding electrode 100 may be 13.0 millimeters or less, for example, about 12.0 millimeters, about 11.0 millimeters, about millimeters, about 9.0 millimeters, about 8.0 millimeters, about 7.0 millimeters, about 6.0 millimeters, about 5.0 millimeters, or about 4.0 millimeters, and the second diameter of the first welding electrode 100 may be 5.0 millimeters or less, for example, about 4.75 millimeters, about 4.5 millimeters, about 4.25 millimeters, about 4.0 millimeters, about 3.75 millimeters, about 3.5 millimeters, about 3.25 millimeters, or about 3.0 millimeters. In certain embodiments, the first diameter of the second welding electrode 200 may be 16.0 millimeters or less, for example, about 15.0 millimeters, about 14.0 millimeters, about 13.0 millimeters, about 12.0 millimeters, about 11.0 millimeters, about 10.0 millimeters, about 9.0 millimeters, about 8.0 millimeters, about 7.0 millimeters, about 6.0 millimeters, or about 5.0 millimeters, the second diameter of the second welding electrode 200 may be millimeters or less, for example, about 4.75 millimeters, about 4.5 millimeters, about 4.25 millimeters, about 4.0 millimeters, about 3.75 millimeters, about 3.5 millimeters, about 3.25 millimeters, or about 3.0 millimeters, and the third diameter of the second welding electrode 200 may be between 16.0 and 5.0 millimeters, for example, about 16.0 millimeters, about 15.0 millimeters, about 14.0 millimeters, about 13.0 millimeters, about 12.0 millimeters, about 11.0 millimeters, about 10.0 millimeters, about 9.0 millimeters, about 8.0 millimeters, about 7.0 millimeters, about 6.0 millimeters, or about 5.0 millimeters.

In various embodiments, the first welding electrode 100 and the second welding electrode 200 each include an insulative material 120/220 covering at least a portion of the first section 110/210 of the body thereof. The insulative material 120/220 is configured to mitigate current shunting upon contact between the insulative material 120/220 and a workpiece of a workpiece stack-up while resistance welding the workpiece stack-up. In general, current shunting decreases a current density at faying surfaces of the workpieces, and therefore decreases a resulting size of the weld nugget produced. The insulative material 120/220 may be located at least a minimum dimension from the weld face 212 of the body of the first welding electrode 100 or the second welding electrode 200 such that the insulative material 120/220 does not compromise or substantially affect a fluid cooling effect of the conductive tip of the first welding electrode 100 or the second welding electrode 200. In some embodiments, the insulative material 120/220 is about 6.0 millimeters or more from the weld face 212 of the body of the first welding electrode 100 or the second welding electrode 200, such as about 7.0 millimeters, about 8.0 millimeters, or about 9.0 millimeters or more.

The first welding electrode 100 and the second welding electrode 200 may include various materials, including certain metallic, ceramic, polymeric, and composite materials. Nonlimiting examples of suitable materials for the bodies of the first welding electrode 100 and the second welding electrode 200 may include various conductive materials such as copper and copper alloys such as those that include alloying elements intended to promote hardness (e.g., chromium, zirconium, etc.). Nonlimiting examples of suitable materials for the insulative material 120/220 may include certain insulative materials such as nylon polyamide (e.g., Rilsan®), ethylene-chlorotrifluoroethylene (E-CTFE; e.g., Halar®), chlorotrifluoroethylene (CTFE), silicone, silicone-glass, silicone-ceramic, and various ceramic-inorganic materials.

Figure 3:
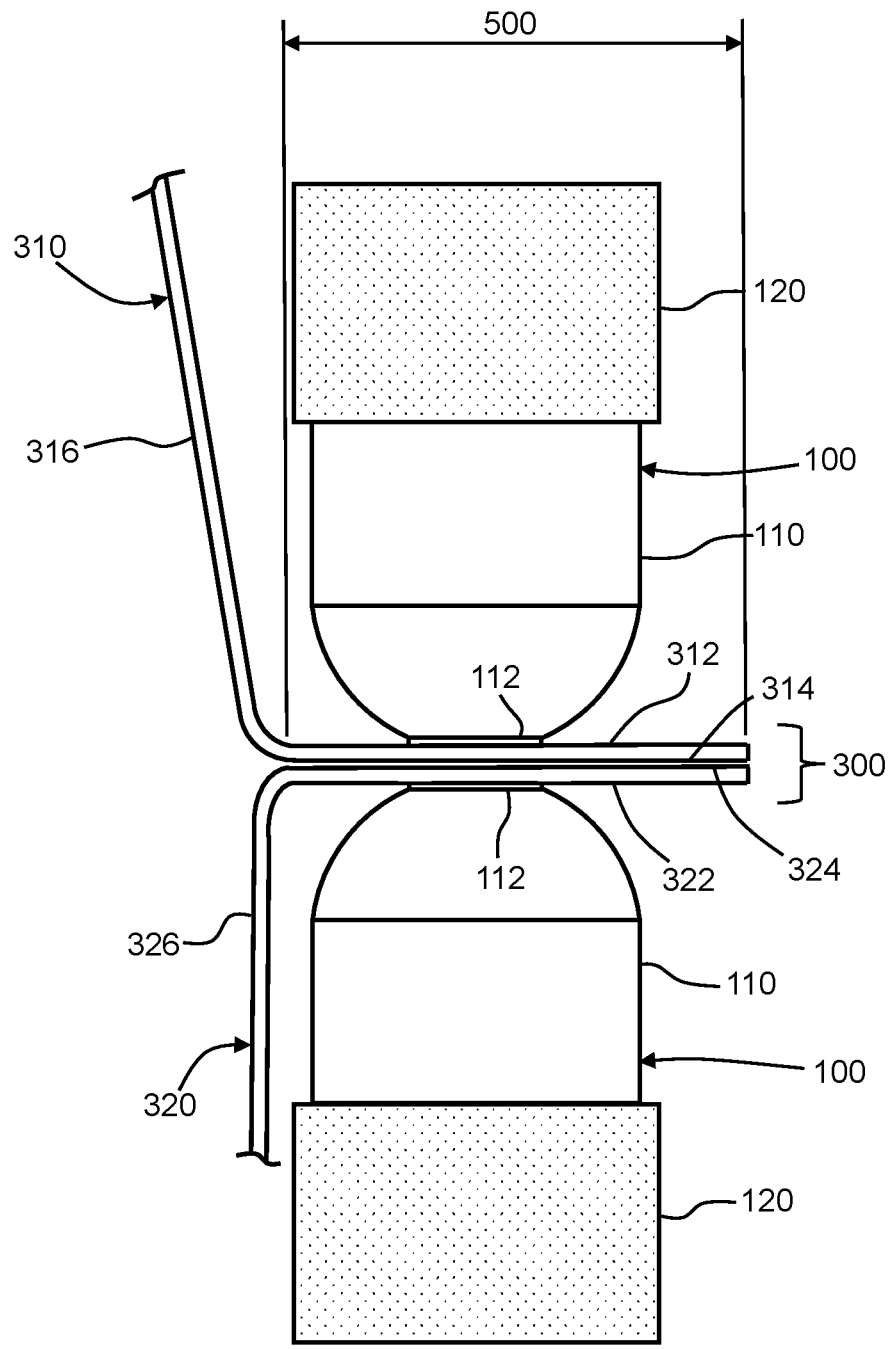
FIG. 3 is a schematic of a method for resistance welding workpieces with the first welding electrode of FIG. 1 in accordance with an embodiment.
Figure 4:
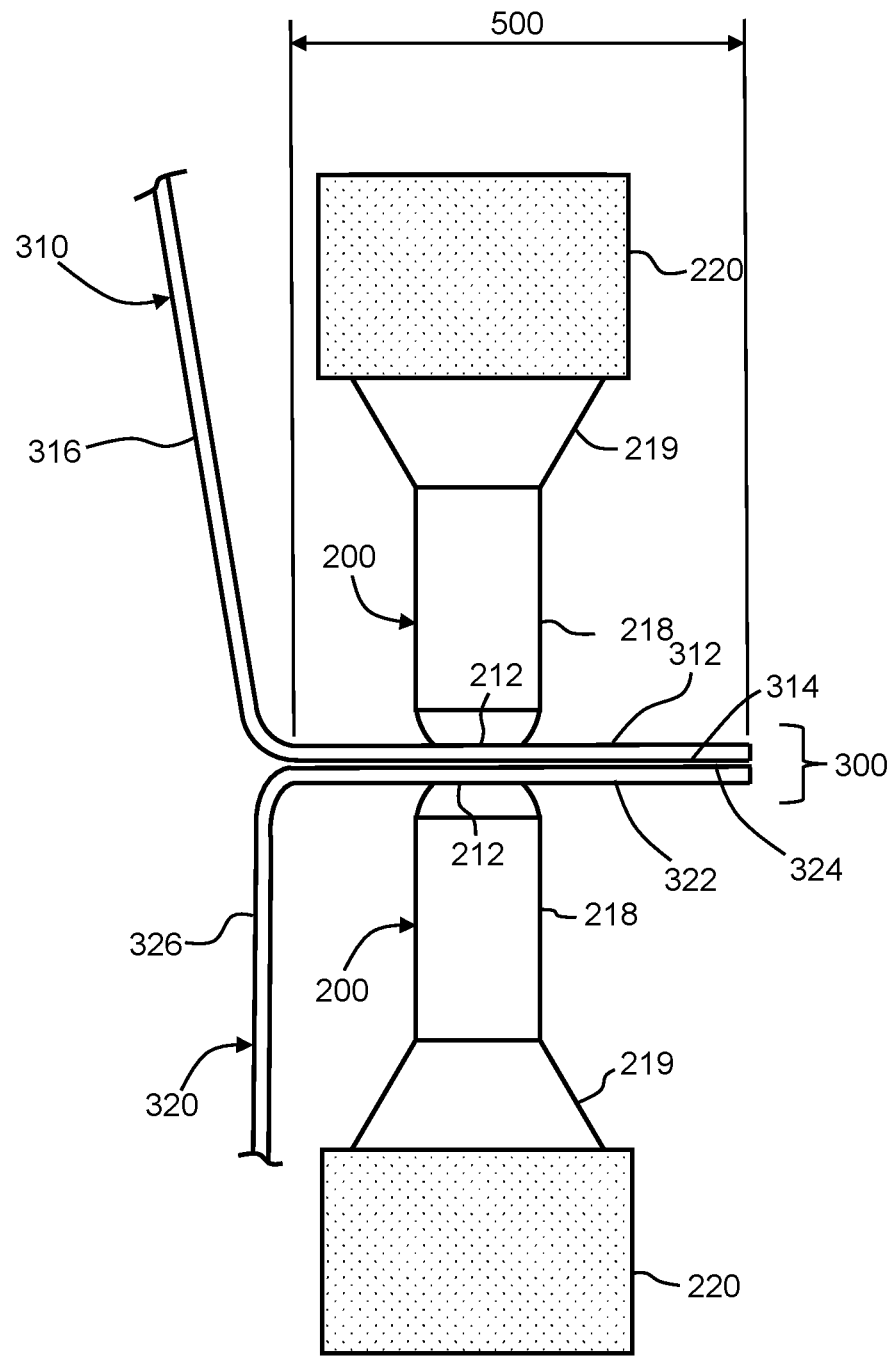
FIG. 4 is a schematic of a method for resistance welding workpieces with the second welding electrode of FIG. 2 in accordance with an embodiment.

FIGS. 3 and 4 schematically represent methods for resistance welding workpieces with a pair of the first welding electrode 100 and a pair of the second welding electrode 200, respectively. More specifically, FIG. 3 shows two opposed welding electrodes identical to the first welding electrode 100 in contact with a workpiece stack-up 300, and FIG. 4 shows two opposed welding electrodes identical to the second welding electrode 200 in contact with the workpiece stack-up 300. It is noted that these arrangements are merely exemplary, and the pairs of welding electrodes may not be identical. Further, it is noted that either or both of the pairs of the welding electrodes may have other structures, such that other geometries are contemplated for the pairs of the welding electrodes. In this example, the workpiece stack-up 300 includes a first workpieces 310 and a second workpiece 320; however, the workpiece stack-up 300 may include additional workpieces (e.g., 3, 4, or more workpieces).

For these examples, the workpiece stack-up 300 includes the first workpiece 310 and the second workpiece 320 that include a first flange 312 and a second flange 322, respectively, extending therefrom. A faying surface 314 of the first flange 312 and a faying surface 324 of the second flange 322 are positioned parallel to each other and contacted in preparation of forming a weld joint therebetween (e.g., spot weld). The flanges 312/322 define angles with adjacent portions 316/326 of the remainder of the workpieces 310/320, for example, between 90 and 179 degrees. The flanges 312/322 each extend from the adjacent portions of the remainders of the workpieces 310/320 by a dimension (identified with reference number 500 in FIGS. 3 and 4) of less than 10 millimeters.

The workpiece stack-up 300 and its components may include various materials, including certain metallic, conductive ceramic, conductive polymeric, and conductive composite materials. As nonlimiting examples, the flanges 312/322 of the workpiece stack-up 300 may include metal or metal alloys, such as aluminum, aluminum alloy, magnesium, magnesium alloys, or other suitable metals. For example, the workpieces 310/320 may be 2000, 6000, or 7000 series cast or extruded aluminum alloys suitable for automotive use. In certain examples, each workpiece 310/320 may have a thickness of less than 6 mm, such as less than 4 mm, for example less than 2 mm, or less than 1 mm, and a thickness greater than 0.1 mm, such as greater than 0.4 mm, or greater than 1 mm. In some examples, each workpiece 310/320 has a thickness of between about 0.4 mm and 6 mm.

Figure 5:
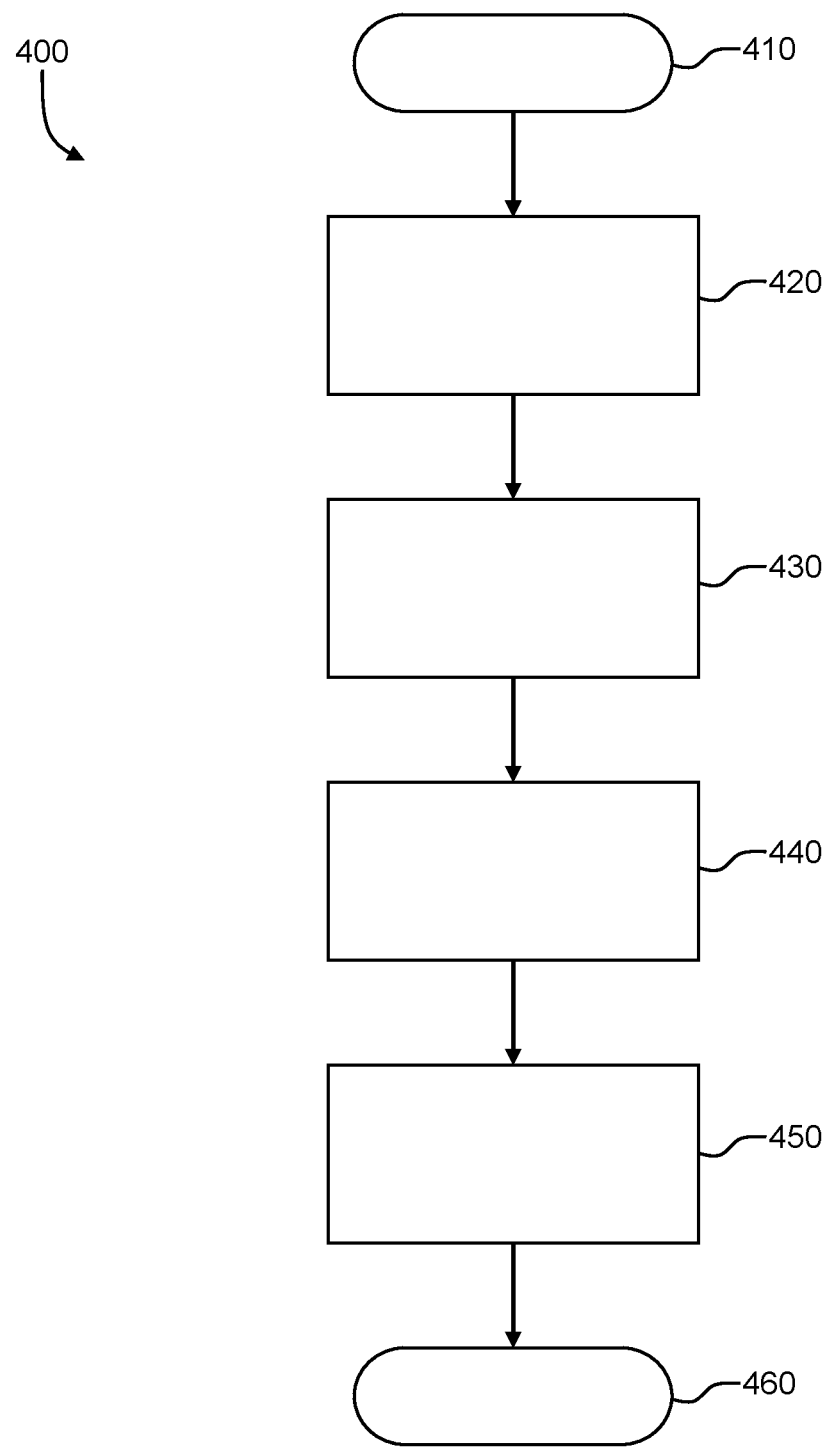
FIG. 5 is a flow chart illustrating a method for resistance welding workpieces in accordance with an embodiment.

FIG. 5 is a flow chart illustrating a method 400 for resistance welding workpieces, for example, with the pairs of welding electrodes 100/200 of FIGS. 3 and 4. The method 400 may start at 410. At 420, the workpiece stack-up is provided that includes the narrow flanges. The pair of welding electrodes (e.g., the pair of the first welding electrode 100 or the second welding electrode 200) are contacted with opposite sides of the narrow flanges at 430. Under an applied electrode force, an electrical current is passed between the pair of welding electrodes at 440 to form the molten weld pool at the faying surfaces. The molten weld pool may be cooled (e.g., actively, or passively) at 450 to form the weld joint. The method 400 may end at 460.

In various embodiments, the method 400 includes locating the pair of electrodes on the workpiece stack-up using a camera system. In such embodiments, the camera system may be used to increase the likelihood that the pair of electrodes contact desired locations of the workpiece, such as centers of the flanges.

In various embodiments, the method 400 may include welding the workpiece stack-up in accordance with a specific welding schedule which may be tailored to the workpiece stack-up and/or the pair of welding electrodes. The welding schedule may include a constant welding electrode contact force, that is, the force applied to the opposite sides of the workpiece stack-up with the welding electrodes, and a variable electrical current. In some embodiments, the electrical current is varied during the resistance welding process to provide for a preheating phase prior to a welding phase.

Figure 6:
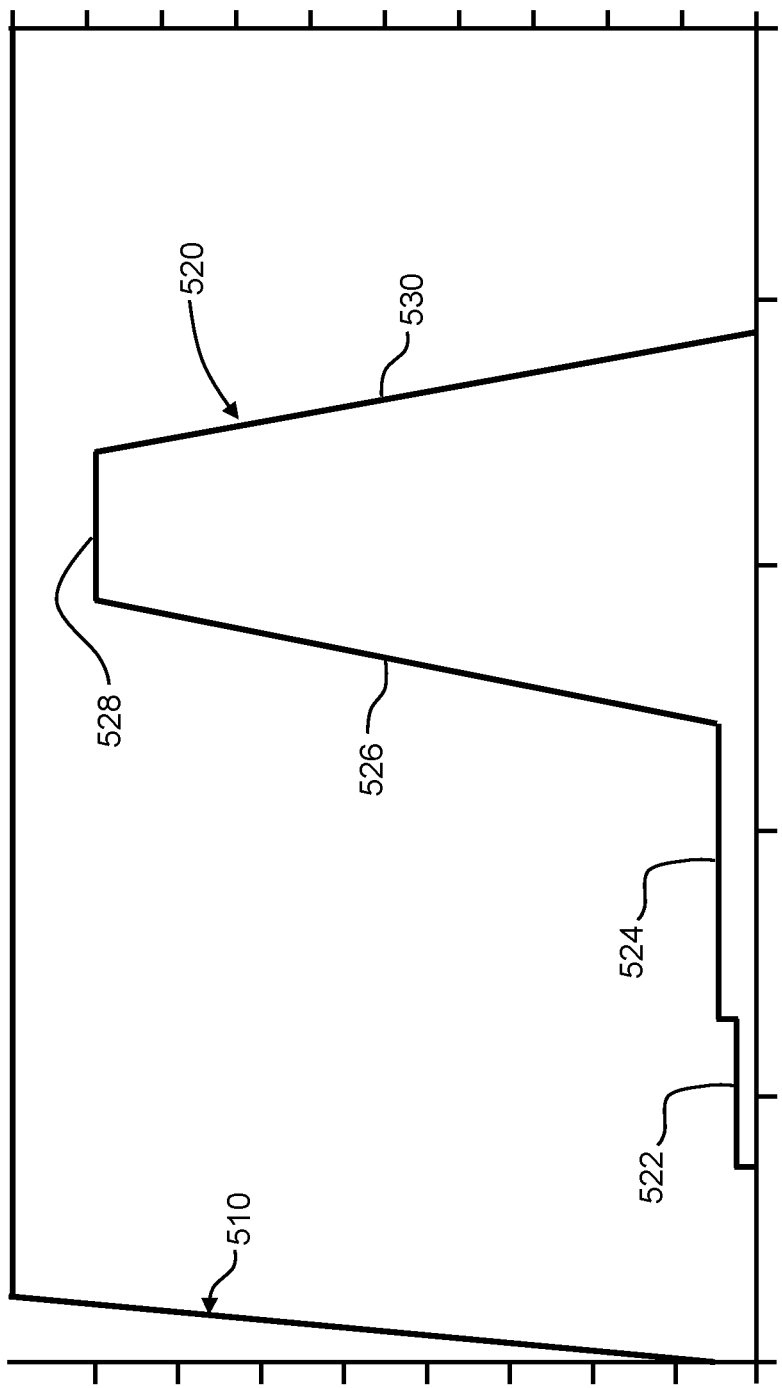
FIG. 6 presents a graph representing a welding schedule for resistance welding workpieces in accordance with an embodiment wherein the left axis is current (kA), the bottom axis is process time (ms), and the right axis is force (kN)

FIG. 6 presents a graph representing an exemplary welding schedule for resistance welding workpieces. The welding schedule includes a constant welding electrode contact force represented with line 510, and a variable electrical current represented with line 520. The welding schedule includes two-step preheating phase wherein the electrical current is initially increased to and maintained at a first current value at 522 and then increased to and maintained at a second current value at 524. The preheating phase is configured to increase the temperature of the workpiece and thereby reduce a contact resistance of the workpiece prior to the welding phase. As such, the first current value and the second current value are both below a minimum current value necessary to cause melting of the workpiece.

The welding schedule includes a three-step welding phase wherein the electrical current is increased from the second current value to a third current value at a first rate of change (i.e., upslope portion 526 of the line 520), maintained at the third current value (i.e., flat portion 528 of the line 520), and then decreased from the third current value at a second rate of change (i.e., downslope portion 530 of the line 520). During the welding phase, the electrical current is increased at the first rate of change and decreased at the second rate of change to reduce the likelihood of welding expulsion during the formation and cooling of the molten weld pool, widen a weld window, promote weld nugget size, and/or mitigate temperatures at the surface of the electrode (and thereby prolong electrode life and reduce tip dressing frequency). In some embodiments, the molten weld pool may begin to form during the increase in the electrical current from the second current value to the third current value (i.e., the upslope portion 526 of the line 520), and may begin to solidify during the decrease in the electrical current from the third current value (i.e., the downslope portion 530 of the line 520). As such, the third current value is above the minimum current value.

Notably, the welding schedule of FIG. 6 is exemplary. Suitable welding schedules may be more or fewer preheating steps and welding steps. Appropriate welding schedules may be dependent on the workpiece structure and material, the welding electrode structure and material, and various operating parameters/capabilities of the resistance welding system.

The specific welding electrode contact force and current values of the electrical current will be dependent on the configuration and materials of the welding electrodes and of the workpiece stack-up. In various embodiments, the welding electrode contact force may be increased to and maintained at a value of 4.4 kN or less, such as about 4.0 kN, about 3.5 kN, about 3.0 kN, about 2.5 kN, about 2.4 kN, about 2.3 kN, about 2.2 kN, about 2.1 kN, about 2.0 kN, about 1.9 kN, about 1.8 kN, about 1.7 kN, about 1.6 kN, or about 1.5 kN. In various embodiments, the electrical current (direct current) may be 2 kA or less during the preheating phase, such as about 1.9 kA, about 1.8 kA, about 1.7 kA, about 1.6 kA, about 1.5 kA, about 1.4 kA, about 1.3 kA, about 1.2 kA, about 1.1 kA, about 1.0 kA, about 0.9 kA, about 0.8 kA, about 0.7 kA, about 0.6 kA, about 0.5 kA, about 0.4 kA, or about 0.3 kA. In various embodiments, the electrical current may be 5 to 16 kA during the welding phase, such as about 15.0 kA, about 14.0 kA, about 13.0 kA, about 12.0 kA, about 11.0 kA, about 10.0 kA, about 9.0 kA, about 8.0 kA, about 7.0 kA, about 6.0 kA, or about kA. In various embodiments, the welding process time may be 200 ms or less, such as about 175 ms, about 150 ms, or about 125 ms. In various embodiments, the welding phase may be 100 ms or less, such as about 90 ms, about 80 ms, or about 70 ms. In various embodiments, the preheating phase may be 100 ms or less, such as about 90 ms, about 80 ms, or about 70 ms. In various embodiments, the first rate of change and the second rate of change of the electrical current may each be about 0.3 to 0.9 kA/ms, such as about 0.35 kA/ms, about 0.4 kA/ms, about 0.45 kA/ms, about 0.50 kA/ms, about 0.55 kA/ms, about kA/ms, about 0.65 kA/ms, about 0.7 kA/ms, about 0.75 kA/ms, about 0.8 kA/ms, or about 0.85 kA/ms. In various embodiments, the coolant (e.g., water) flow rate may be about to 4.0 l/min, such as about 1.0 l/min, about 1.5 l/min, about 2.0 l/min, about 2.5 l/min, about 3.0 l/min, or about 3.5 l/min.

Figure 7:
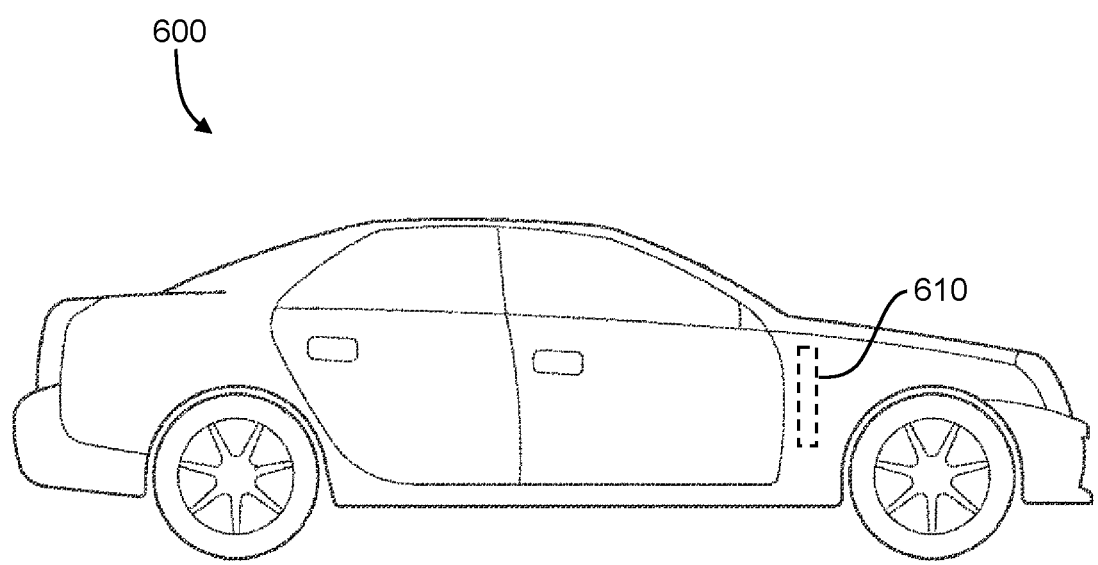
FIG. 7 presents a side view of a vehicle that includes a resistance-welded assembly in accordance with an embodiment.

As disclosed herein, the resistance-welded assembly may form an automotive vehicle component, such as a vehicle door, hood, trunk lid, lift gate, or other body part. In some examples, the vehicle component is a structural component. Therefore, in an embodiment herein a vehicle is provided and includes the resistance-welded metal assembly comprising: the first workpiece comprised of a metal or metal alloy, the second workpiece comprised of a same or different metal or metal alloy, and the weld nugget that forms all or part of the weld joint between the first workpiece and the second workpiece. FIG. 7 schematically represents a vehicle 600 that includes a component 610 that is a resistance-welded assembly fabricated in accordance with the method 400.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for resistance welding, the method comprising:
   providing a workpiece stack-up including a first flange of a first workpiece and a second flange of a second workpiece, wherein the first flange extends from a remainder of the first workpiece by a first dimension of 10 millimeters or less and the second flange extends from a remainder of the second workpiece by a second dimension of 10 millimeters or less;
   bringing a first welding electrode into contact with the first flange and bringing a second welding electrode into contact with the second flange;
   passing an electrical current between the first welding electrode and the second welding electrode in accordance with a welding schedule that includes a preheating phase and a welding phase, wherein the preheating phase includes at least one preheating step during which the electrical current is held at a first current value that is below a minimum current value necessary to cause melting of the first flange and the second flange, wherein the welding phase includes at least one welding step during which the electrical current is held at a second current value that is above the minimum current value for a time sufficient to form a molten weld pool within the first workpiece and the second workpiece, wherein the electrical current is direct current; and
   ceasing the passing of the electrical current between the first welding electrode and the second welding electrode to allow the molten weld pool to solidify into a weld nugget that forms all or part of a weld joint between the first workpiece and the second workpiece.

2. The method of claim 1, wherein the first welding electrode and the second welding electrode each include a body having a first section that has a first diameter, a weld face on a distal end of the body that has a second diameter that is less than the first diameter, and a first intermediate section between the first section and the weld face that transitions from the first diameter to the second diameter.

3. The method of claim 1, wherein the first welding electrode and the second welding electrode each include a body having a first section that has a first diameter, a weld face on a distal end of the body that has a second diameter that is less than the first diameter, a second section that has a third diameter that is less than the first diameter and greater than the second diameter, a first intermediate section between the first section and the second section that transitions from the first diameter to the third diameter, and a second intermediate section between the second section and the weld face that transitions from the third diameter to the second diameter.

4. The method of claim 1, wherein the first welding electrode and the second welding electrode each include a body having a cavity defined by interior surfaces of the body, and the method includes providing a cooling fluid to the cavity of the first welding electrode and the cavity of the second welding electrode while passing the electrical current between the first welding electrode and the second welding electrode.

5. The method of claim 1, wherein the first welding electrode and the second welding electrode each include a body, and the method includes covering at least a portion of the body of the first welding electrode with an insulative material configured to mitigate current shunting upon contact between the insulative material and the first workpiece while passing the electrical current between the first welding electrode and the second welding electrode.

6. The method of claim 5, wherein the insulative material is 6 millimeters or more from a distal end of the body of the first welding electrode and the second welding electrode.

7. The method of claim 1, wherein the first dimension is 8 millimeters or less and the second dimension is 8 millimeters or less.

8. The method of claim 1, wherein the welding phase of the welding schedule includes:
   a first step during which the electrical current is increased from the first current value to the second current value at a first rate of change;
   a second step during which the electrical current is held at the second current value; and
   a third step during which the electrical current is decreased from the second current value at a second rate of change.

9. The method of claim 8, wherein the first current value is 0.3 to 2.0 kA and the second current value is 5.0 to 16.0 kA.

10. The method of claim 1, wherein the first welding electrode and the second welding electrode are each pressed against the first flange and the second flange, respectively, with a force of 2.5 kN or less.

* * * * *